(12) United States Patent
Tourapis et al.

(10) Patent No.: US 11,606,569 B2
(45) Date of Patent: Mar. 14, 2023

(54) EXTENDING SUPPORTED COMPONENTS FOR ENCODING IMAGE DATA

(71) Applicant: Apple Inc., Cupertino, CA (US)

(72) Inventors: Alexandros Tourapis, Los Gatos, CA (US); Yeping Su, Cupertino, CA (US); Khaled Mammou, Vancouver (CA); Jungsun Kim, San Jose, CA (US); David W. Singer, San Francisco, CA (US); Fabrice A. Robinet, Sunnyvale, CA (US); Guy Cote, San Jose, CA (US); Jim C. Chou, San Jose, CA (US); Hsi-Jung Wu, San Jose, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 16/583,153

(22) Filed: Sep. 25, 2019

(65) Prior Publication Data

US 2020/0099942 A1 Mar. 26, 2020

Related U.S. Application Data

(60) Provisional application No. 62/736,408, filed on Sep. 25, 2018.

(51) Int. Cl.
*H04N 19/186* (2014.01)
*H04N 19/159* (2014.01)
*H04N 19/176* (2014.01)
*H04N 19/124* (2014.01)

(52) U.S. Cl.
CPC ......... *H04N 19/186* (2014.11); *H04N 19/124* (2014.11); *H04N 19/159* (2014.11); *H04N 19/176* (2014.11)

(58) Field of Classification Search
CPC .. H04N 19/176; H04N 19/159; H04N 19/117; H04N 19/186; H04N 19/46; H04N 19/124; H04N 19/86
See application file for complete search history.

(56) References Cited

U.S. PATENT DOCUMENTS

| | | | | |
|---|---|---|---|---|
| 7,574,063 | B2* | 8/2009 | Kajiwara | H04N 19/176 |
| | | | | 382/232 |
| 9,749,646 | B2* | 8/2017 | Zhu | H04N 19/186 |
| 2002/0159653 | A1* | 10/2002 | Dekel | H04N 19/635 |
| | | | | 382/282 |
| 2003/0005140 | A1* | 1/2003 | Dekel | G06Q 50/22 |
| | | | | 709/231 |
| 2007/0217699 | A1* | 9/2007 | Mahiar | H04N 19/1883 |
| | | | | 382/232 |
| 2008/0137753 | A1* | 6/2008 | He | H04N 19/61 |
| | | | | 375/240.24 |
| 2008/0298702 | A1* | 12/2008 | Gunupudi | H04N 19/124 |
| | | | | 382/251 |

(Continued)

*Primary Examiner* — Neil R Mikeska
(74) *Attorney, Agent, or Firm* — Alexander A. Knapp; Kowert, Hood, Munyon, Rankin & Goetzel, P.C.

(57) ABSTRACT

Support for additional components may be specified in a coding scheme for image data. A layer of a coding scheme that specifies color components may also specify additional components. Characteristics of the components may be specified in the same layer or a different layer of the coding scheme. An encoder or decoder may identify the specified components and determine the respective characteristics to perform encoding and decoding of image data.

25 Claims, 7 Drawing Sheets

(56) References Cited

U.S. PATENT DOCUMENTS

| | | | | |
|---|---|---|---|---|
| 2010/0020867 | A1* | 1/2010 | Wiegand | H04N 19/34 |
| | | | | 375/240.02 |
| 2012/0013746 | A1* | 1/2012 | Chen | G11B 27/034 |
| | | | | 348/180 |
| 2014/0362922 | A1* | 12/2014 | Puri | H04N 19/167 |
| | | | | 375/240.16 |
| 2016/0029024 | A1* | 1/2016 | Shand | H04N 19/428 |
| | | | | 375/240.03 |
| 2016/0212373 | A1* | 7/2016 | Aharon | H04N 19/513 |
| 2017/0223368 | A1* | 8/2017 | Abbas | H04N 19/59 |
| 2018/0109800 | A1* | 4/2018 | Kazui | H04N 19/176 |
| 2019/0096027 | A1* | 3/2019 | Fielding | G06T 15/005 |
| 2019/0289294 | A1* | 9/2019 | Hsu | H04N 19/13 |
| 2020/0137399 | A1* | 4/2020 | Li | H04N 19/176 |
| 2020/0244997 | A1* | 7/2020 | Galpin | H04N 19/82 |

* cited by examiner

EXTENDING SUPPORTED COMPONENTS FOR ENCODING IMAGE DATA

RELATED APPLICATIONS

This application claims benefit of priority to U.S. Provisional Application Ser. No. 62/736,408, entitled "EXTENDING SUPPORTED COMPONENTS FOR ENCODING IMAGE DATA," filed Sep. 25, 2018, and which is incorporated herein by reference in its entirety.

BACKGROUND

Technical Field

This disclosure relates generally to compression and decompression of image data.

DESCRIPTION OF THE RELATED ART

Compression and decompression techniques for image data (e.g., codecs for digital photographs, still images, or video data) may commonly support up to three color components because a majority of the color models used by imaging applications are based on three color component models or color spaces, such as RGB, XYZ, YCbCr, ICtCp, HSV and so on. Such models may be based on the theory that color perception can be sufficiently described in terms of three different primary colors.

However, other image data features can enhance color perception. For example, in digital applications such as wide color and high dynamic range video distribution and displays, photography, and printing, specifying additional image data features (e.g., additional "primaries") could allow the production of a wider range of colors than it would be possible with only three, limited precision, primary colors. For example, displays that use six primaries, i.e. red, green, blue, cyan, magenta, and yellow (RGBCMY) one can achieve almost 170% greater color gamut than could be achieved with three primaries as would be found in a standard RGB display.

Yet for all of the benefits that additional features in image data may provide, such as additional primaries, existing color models or color spaces do not include such additional features when representing image data (e.g., digital images or video), and thus compression and decompression techniques for them are not supported as well. While some attempts to use higher precision and different definitions of color spaces, such as the RGB space, (e.g. using the BT.2020/BT.2100 RGB space instead of the narrower BT.709 or P3D65 RGB spaces), have been used to cover wider color spaces, increasing the precision and definitions can have drawbacks in terms of implementation, but also color coverage (i.e. the increased precision may result in color spaces that are too wide and cover not only useful colors within their limited precision but unused or other unuseful colors, wasting available code values in the representation).

In addition to expanding the color space or model, some image data may be associated with other image-like data features, such as depth information, infrared signals, and transparency information among examples. Although such features may have very high correlation with the visible light image data, in advanced codecs such as Advanced Video Encoding (AVC), High Efficiency Video Encoding (HEVC), and AOMedia Video 1 (AV1), such features may be encoded independently as separate layers and thus no correlation or similar characteristics between these different layers may be exploited. More basic codecs or containers, such as Tagged Image File Format (TIFF) and OpenEXR, may support some interleaving of transparency data with visible light data, e.g. with the support of the Red Green Blue Alpha (RGBA) format, however, these do not include any advanced compression mechanism, and thus again the coding efficiency of such information may be reduced.

New applications are also emerging, such as light field image compression and point cloud compression, where additional layers of information, beyond visible light signals or visible light signals perceived under different conditions, may be encoded. For point cloud data, for example, for every point in the representation, apart from its geometry location, additional information may be included such as RGB data from one or more angles, transparency information, reflectance, material ID, and absorption information, among others. On the other hand, light field data may have been converted to other representations, e.g. using the surface light field (SLF) method and representation, and then encoded with methods devised for point cloud compression. One such technique for point cloud compression is the MPEG V-PCC coding standard, which is based on a combination of efficient point cloud/3D representation projection methods to 2D surfaces and the use of existing 2D video coding technologies/codecs for compressing these surfaces. Unfortunately, because of the limitations of these video codecs in terms of handling multi-component data, the various point cloud attributes are commonly grouped in sub groups or layers of 1 or 3 components, e.g. one geometry group, a three component RGB texture group, a transparency or reflectance layer, etc., and then encoded independently. This implies that such information is not optimally coded since not all redundancies between these groups are exploited. This can also have other implications such as requiring a decoder to decode all dependent layers to extract all components/properties of a single sample, which could impact the complexity and power utilization to implement such techniques, as well the memory requirements of such techniques.

SUMMARY OF EMBODIMENTS

In some embodiments, a coding scheme may be implemented that supports specifying components in addition to a specified number of color components (e.g. zero or more) in the same layer of the coding scheme. The layer of the coding scheme may also specify different characteristics of the additional components, in some embodiments. In other embodiments, another layer of the coding scheme may specify the characteristics of the additional components. The additional components may be grouped in different ways for determining component characteristics, in some embodiments. The additional components may be grouped for a common configuration of coding stages in an encoder or decoder, or may be individually processed with different configurations of coding stages, in some embodiments.

Figure 1:
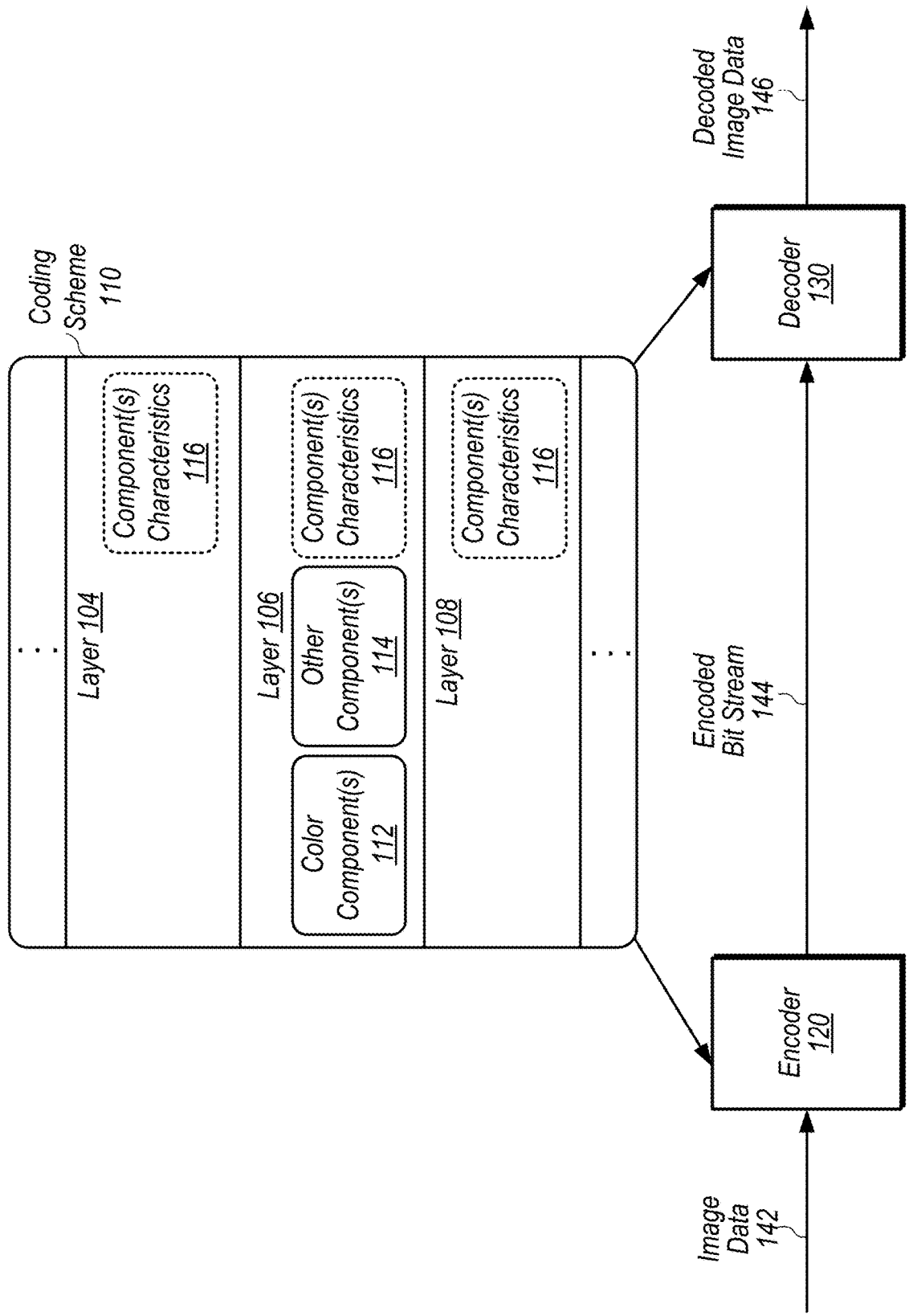
FIG. 1 is a logical block diagram illustrating encoding and decoding with a coding scheme that specifies color and other components in a same layer, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various techniques for extending supported components for encoding image data utilizing a coding scheme that specifies components in addition to color components in a same layer of the coding scheme are described herein. For example, video compression systems may be extended to support one or more features or other components in addition to the typically supported three image components (e.g., the three primaries like Red Blue Green) utilizing a same layer in the coding scheme. In this way, by extending supported components for image data, redundancies that may exist in additionally supported components can improve the characteristics of image data for various applications. For example, an extension (e.g. a new profile) of an existing coding scheme, such as a standard or video codec, including, but not limited to, MPEG-4 AVC/H.264, HEVC/H.265, VP8, VP9, or AV1, could be implemented to support additional component(s) in a layer of the coding scheme, in some embodiments. In some embodiments, the extension of additional components could be added to newly designed coding schemes, such as newly designed standards or codecs, including, but not limited to, the Moving Picture Experts Group (MPEG) Versatile Video Coding (VVC)/H.266 standard, so that both the color and other supported components are specified and encoded in the same layer.

FIG. 1 is a logical block diagram illustrating encoding and decoding with a coding scheme that specifies color and other components in a same layer, according to some embodiments. Coding scheme 110 may implement various layers, such as layers 104, 106, and 108, in which different components and characteristics of image data for encoding and decoding are specified, in some embodiments. For example, each layer may specify a different set of information describing image data in a format specific to that layer and utilized by different components for performing encoding, decoding, or other image processing and/or image data display, including but not limited to example layers, such as Sequence Parameter Set (SPS), Picture Parameter Set (PPS), Slice or Tile. An encoder, such as encoder 120 (e.g., discussed in further detail below with regard to FIG. 2) and a decoder, such as decoder 130 (e.g., discussed in further detail below with regard to FIG. 4) may utilize coding scheme 110 in order to support the encoding together of components in addition to color components in the same layer for received imaged, allowing the encoded bitstream 144 to be more advantageously compressed as well as better allowing the information provided by the additional components to be processed along with the color components to which they correspond when handled as decoded image data 146.

For instance, when image data 142 is received at encoder 120, the other components 114 (e.g., point cloud data, such as geometry location, RGB data from one or more angles, transparency information, reflectance and absorption information, or other additional components to enhance or supplement image data) in addition to color components 112 (e.g., RGB, XYZ, YCbCr, ICtCp, or HSV). While in some embodiments, further characteristics 116 (e.g., resolution, bitdepth, phase if resolution different from that of a "main signal/component" and/or other information about what an additional component represents) for these components 114 may also be included in the same layer (e.g., layer 106 in FIG. 1). In some embodiments, multiple or other layers may indicate or be determinative of characteristics 116 of other components 114, such as layers 104 and 108. In at least some embodiments, the coding techniques described above may apply when the specified number of color components 112 is zero, as some techniques for encoding image data may utilize the same layer for encoding various other kinds of image data components.

In one example of utilizing a single layer of an existing coding scheme to extend supported components, modifications to a layer in the coding scheme may be implemented to make room for specifying the additional components. Consider that existing codecs, such as AVC and HEVC, include in their high-level syntax, (e.g. their sequence or other parameter sets), information about the image format currently used, commonly referred to as the "chroma_format_idc". This image format can take, for instance, four different values, and indicate whether the content is a monochrome signal (chroma_format_idc=0), a chroma 4:2:0 representation (chroma_format_idc=1), a chroma 4:2:2 representation (chroma_format_idc=2), and a chroma 4:4:4 representation (chroma_format_idc=3). 4:X:X chroma representations, (other than the monochrome one), may support three color planes, in some embodiments. In the 4:2:0 and 4:2:2 representations, the chroma components may be subsampled once across both dimensions or horizontally only respectively. The bitdepth for each available color plane may also be signaled separately (e.g. using parameters bit_depth_luma_minus8 for luma and bit_depth_chroma_minus8 for the two chroma components). No variation in bitdepth for the two chroma components may be permitted, in some embodiments. Additional information that provides further characteristics to describe what the samples represent, e.g. the colorimetry of the signal including color primaries, transfer characteristics, and color coefficients, the chroma sampling, etc., may be included in other layers different than a parameter set layer (e.g., SPS layer), such as the Video Usability Information (VUI) or in Supplemental Enhancement Information (SEI) layers, in some embodiments. In one embodiment, only 1 or 3 components may be permitted to be signaled while the resolution and bitdepth relationships between them are quite restrictive.

The examples discussed above can be extended or adapted in a variety of ways. For example, the techniques could be used, either on their own or in combination, in some embodiments.

In some embodiments, a technique for including additional components along with a specified number of color components in a single layer may include a technique where the high level syntax structure (e.g. sequence parameter sets) of a layer in a coding scheme (e.g., for a codec) can include the number of components that the coding scheme supports (instead of signaling the chroma_format_idc parameter). Characteristics for each of these components, such as resolution, bitdepth, phase if resolution different from that of a "main signal/component" (e.g. the first component), and what this component represents, may also be included in the layer, in some embodiments. In some embodiments, such information could be absolute and provide the exact value of the resolution of the component, or, in some embodiments, such information could be relative versus the resolution of the main component or an earlier in order component (e.g., adding or subtracting a specified amount from the main or earlier component characteristic value).

For example, in the High Efficiency Video Coding (HEVC) standard the following syntax is used:

TABLE 1

| | Descriptor |
|---|---|
| seq_parameter_set_rbsp( ) { | |
|    sps_video_parameter_set_id | u(4) |
|    sps_max_sub_layers_minus1 | u(3) |
|    sps_temporal_id_nesting_flag | u(1) |
|    profile_tier_level( 1, sps_max_sub_layers_minus1 ) | |
|    sps_seq_parameter_set_id | ue(v) |
|    chroma_format_idc | ue(v) |
|    if( chroma_format_idc == 3 ) | |
|       separate_color_plane_flag | u(1) |
|    pic_width_in_luma_samples | ue(v) |
|    pic_height_in_luma_samples | ue(v) |
|    conformance_window_flag | u(1) |
|    if( conformance_window_flag ) { | |
|       conf_win_left_offset | ue(v) |
|       conf_win_right_offset | ue(v) |
|       conf_win_top_offset | ue(v) |
|       conf_win_bottom_offset | ue(v) |
|    } | |
|    bit_depth_luma_minus8 | ue(v) |
|    bit_depth_chroma_minus8 | ue(v) |
|    log2_max_pic_order_cnt_lsb_minus4 | ue(v) |
| ... | |
| } | |

In an example embodiment that utilizes absolute signaling for component characteristics, the following syntax (with modifications to the previous example in Table 1 italicized and represented below as Table 2) could be used:

TABLE 2

| | Descriptor |
|---|---|
| seq_parameter_set_rbsp( ) { | |
|    sps_video_parameter_set_id | u(4) |
|    sps_max_sub_layers_minus1 | u(3) |
|    sps_temporal_id_nesting_flag | u(1) |
|    profile_tier_level( 1, sps_max_sub_layers_minus1 ) | |
|    sps_seq_parameter_set_id | ue(v) |
|    *number_of_components_minus1* | *ue(v)* |
|    *if(number_of_components_minus1 != 0)* | |
|       *separate_components_plane_flag* | *u(1)* |
|    *pic_width_in_cmp_samples[0]* | *ue(v)* |
|    *pic_height_in_cmp_samples[0]* | *ue(v)* |
|    *bit_depth_cmp_minus8[0]* | *ue(v)* |
|    *type_cmp[0]* | *ue(v)* |
|    conformance_window_flag | u(1) |
|    if( conformance_window_flag ) { | |
|       conf_win_left_offset | ue(v) |
|       conf_win_right_offset | ue(v) |
|       conf_win_top_offset | ue(v) |
|       conf_win_bottom_offset | ue(v) |
|    } | |
|    *for( i = 1; i <= number_of_components_minus1; i++ ) {* | |
|       *pic_width_in_cmp_samples[i]* | *ue(v)* |
|       *pic_height_in_cmp_samples[i]* | *ue(v)* |
|       *bit_depth_cmp_minus8[i]* | *ue(v)* |
|       *type_cmp[i]* | *ue(v)* |
|    *}* | |
|    log2_max_pic_order_cnt_lsb_minus4 | ue(v) |
| ... | |
| } | |

As illustrated in the example embodiment of Table 2, the characteristics of component "0" may be indicated independently (e.g., resolution, bitdepth, type, etc.). The type (e.g., type_cmp[i]) could be a list of possible values (e.g., where value 0 could correspond to Luma, 1 to Cb, 2 to Cr, 3 to transparency, and so on). For type, the coding scheme may implement a restriction not to permit a previously used value from the full list to be reused, in some embodiments. The list could also be "trimmed" when a particular value has been used for a particular component, so as to improve coding efficiency, in some embodiments. The type could also be signaled in separate layer, such as the VUI layer instead of the SPS as indicated in Table 2. Fixed length encoding techniques could also be used instead of a variable length encoding technique (e.g. exponential golomb encoding), in some embodiments.

In another example embodiment, discussed below with regard to Table 3 (with modifications italicized) that uses relative signaling, (e.g. for the resolution only, and assuming that resolution could involve scaling down only by powers of 2), then the following syntax could be used:

TABLE 3

| | Descriptor |
|---|---|
| seq_parameter_set_rbsp( ) { | |
|     sps_video_parameter_set_id | u(4) |
|     sps_max_sub_layers_minus1 | u(3) |
|     sps_temporal_id_nesting_flag | u(1) |
|     profile_tier_level( 1, sps_max_sub_layers_minus1 ) | |
|     sps_seq_parameter_set_id | ue(v) |
|     *number_of_components_minus1* | *ue(v)* |
|     *if(number_of_components_minus1 != 0)* | |
|         *separate_components_plane_flag* | *u(1)* |
|     pic_width_in_cmp_samples[0] | *ue(v)* |
|     pic_height_in_cmp_samples[0] | *ue(v)* |
|     conformance_window_flag | u(1) |
|     if( conformance_window_flag ) { | |
|         conf_win_left_offset | ue(v) |
|         conf_win_right_offset | ue(v) |
|         conf_win_top_offset | ue(v) |
|         conf_win_bottom_offset | ue(v) |
|     } | |
|     bit_depth_cmp_minus8[0] | ue(v) |
|     *for( i = 1; i <= number of components minus1; i++ ) {* | |
|         *log2_pic_width_in_cmp_scale[i]* | *ue(v)* |
|         *log2_pic_height_in_cmp_scale[i]* | *ue(v)* |
|         *bit_depth_cmp_minus[i]* | *ue(v)* |
|     *}* | |
|     log2_max_pic_order_cnt_lsb_minus4 | ue(v) |
| ... | |
| } | |

As illustrated in the example embodiment of Table 3, "log 2_pic_width_in_cmp_scale" and "log 2_pic_height_in_cmp_scale" may specify the scaling quantity (e.g., in powers of 2) for the width and height of that component respectively versus that of component 0. If these values were, for example, equal to 0, then no scaling may be performed. If these values were equal to 1, then the corresponding dimension may be scaled down by 2×.

Figure 2:
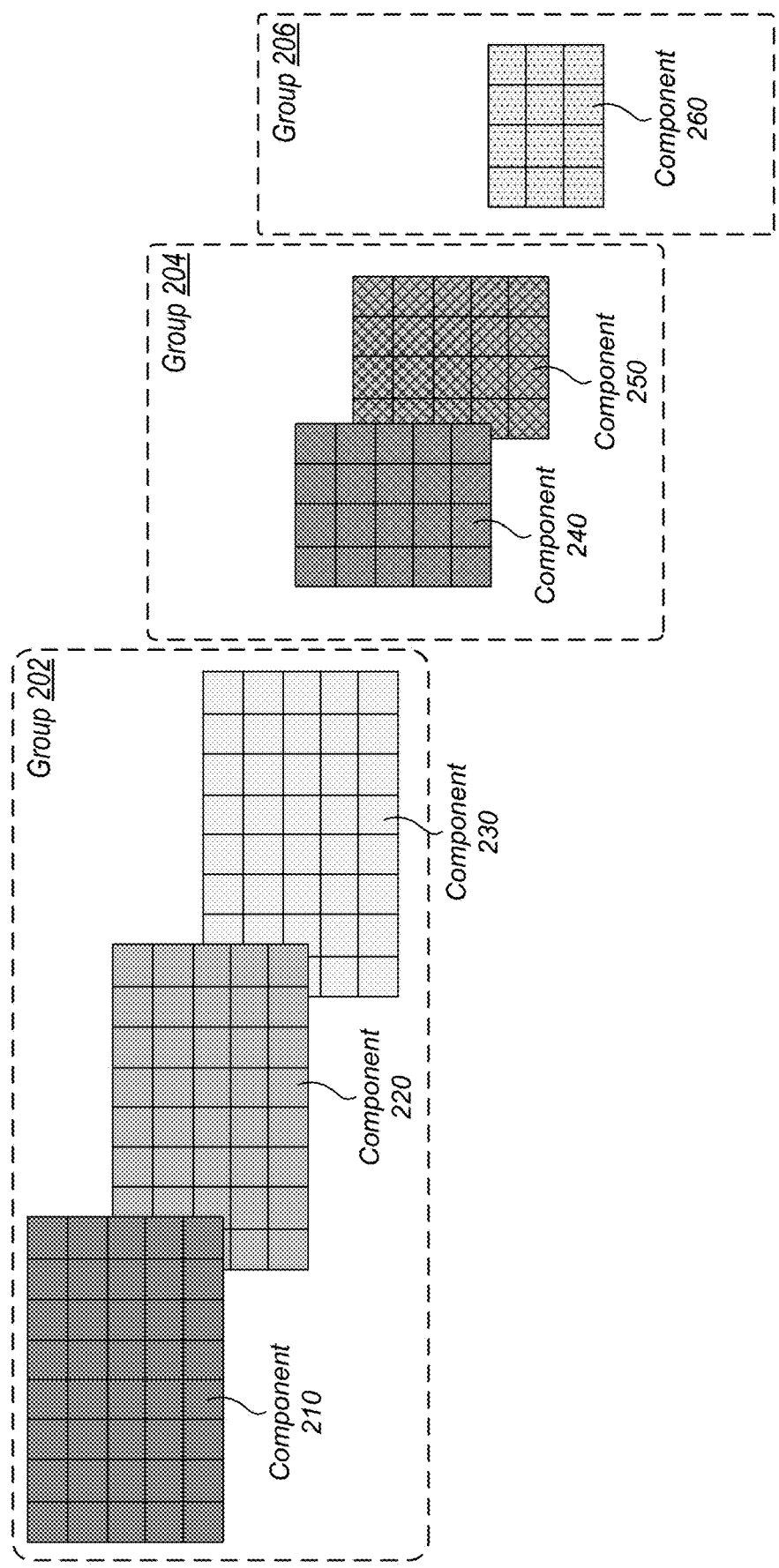
FIG. 2 illustrates example components of image data that may be supported when support for components is extended, according to some embodiments.

FIG. 2 illustrates example components of image data that may be supported when support for components is extended, according to some embodiments. A multi-component signal may be implemented in some embodiments with different resolutions for each component. Components, such as those illustrated in FIG. 2 may be grouped (e.g., by resolution). For example, components 210, 220, and 230, may be of resolution 8×5 in group 202, components 240 and 250 are of resolution 4×5 in group 204, and component 260 of 4×3 in group 206, in some embodiments.

In alternative embodiments, the relative signaling could be done in relationship to a previous component (e.g., component (i−1), or could be restricted for a group of M color components, or could specify an upscaling instead of downscaling of resolution. In some embodiments, grouping could be known to both encoder or decoder, or could also be signaled as part of the same high-level syntax structure in the coding scheme (e.g. by adding a "grouping" segment in the syntax), in some embodiments. Bitdepth could also be signaled using an absolute or relative method, in some embodiments.

In various embodiments, the resolution of each component could be determined based on the quality importance of each component, and/or could also be imposed by the characteristics of the capture or display system used for the particular representation (e.g. a system may have a more limited resolution sensor for capturing depth or infrared information from a scene versus visible light sensors).

In various embodiments, a tiered method for signaling the number of components could be used, so as to reduce signaling and better cater for the more "common" usage modes. For example, a first signal, such as a flag, may be implemented to indicate (e.g., if flag==0), a preset number of modes that is known to both encoder and decoder. The flag may indicate (e.g., if flag==1) an explicit mode, in some embodiments, to be used (as discussed above prior to Table 1 with regard to signaling the number of components supported in a coding scheme and the characteristics of the supported components). An example is shown in the below syntax Table 4 (with modifications highlighted) where the explicit or implicit signaling may be implemented through the explicit_component_mode_flag, in some embodiments. If that explicit_component_mode_flag is 0, the component relationships may be determined through the signaling of a single element, (e.g., component_format_idc), which may indicate (i.e. using a table method) what format is used, in some embodiments.

The tiered method, discussed above, may be an extension of the chroma_format_idc method as discussed above prior to Table 1 with regard to signaling the number of components supported in a coding scheme and the characteristics of the supported components), in some embodiments. For example, in one embodiment, acomponent_format_idc could take the exact same values as chroma_format_idc. In this case, the expected relationships between cmp0 (e.g. the luma sample plane) and all subsequent planes in terms of resolution may be specified, and possibly even bitdepth. In another example, in the explicit mode (explicit_component_mode_flag==1), such information can be signaled explicitly (as discussed above prior to Table 1 with regard to signaling the number of components supported in a codec and the characteristics of the supported codecs), as illustrated below in Table 4 (with modifications italicized).

TABLE 4

| | Descriptor |
|---|---|
| seq_parameter_set_rbsp( ) { | |
|     sps_video_parameter_set_id | u(4) |
|     sps_max_sub_layers_minus1 | u(3) |
|     sps_temporal_id_nesting_flag | u(1) |
|     profile_tier_level( 1, sps_max_sub_layers_minus1 ) | |
|     sps_seq_parameter_set_id | ue(v) |
|     *explicit_component_mode_flag* | *u(1)* |
|     *if (explicit component mode flag == 0) {* | |
|         *component_format_idc* | *ue(v)* |
|         *if(number_of_components_minus1 != 0)* | |
|             *separate_components_plane_flag* | *u(1)* |
|         *pic_width_in_cmp0_samples* | *ue(v)* |
|         *pic_height_in_cmp0_samples* | *ue(v)* |
|         *bit_depth_cmp0_minus8* | *ue(v)* |
|         *bit_depth_cmpX_minus8* | *ue(v)* |
|     *else {* | |
|         *number_of_components_minus1* | *ue(v)* |
|         *if(number_of_components_minus1 != 0)* | |
|             *separate_components_plane_flag* | *u(1)* |
|         *pic_width_in_cmp_samples[0]* | *ue(v)* |
|         *pic_height_in_cmp_samples[0]* | *ue(v)* |
|         *bit_depth_cmp_minus8[0]* | *ue(v)* |
|         *for( i = 1; i <= number of components minus1; i++ ) {* | |

TABLE 4-continued

| | Descriptor |
|---|---|
| log2_pic_width_in_cmp_scales[i] | ue(v) |
| log2_pic_height_in_cmp_scales[i] | ue(v) |
| bit_depth_cmp_minus8[i] | ue(v) |
| } | |
| } | |
| conformance_window_flag | u(1) |
| if( conformance_window_flag ) { | |
|    conf_win_left_offset | ue(v) |
|    conf_win_right_offset | ue(v) |
|    conf_win_top_offset | ue(v) |
|    conf_win_bottom_offset | ue(v) |
| } | |
| log2_max_pic_order_cnt_lsb_minus4 | ue(v) |
| ... | |
| } | |

In some embodiments, texture data may always be available, and other additional components may be optional. In such embodiments, the chroma_format_idc parameter may be retained and optionally include the additional components, as illustrated in the example embodiment of the syntax (with modifications italicized) in Table 5 below:

TABLE 5

| | Descriptor |
|---|---|
| seq_parameter_set_rbsp( ) { | |
|   sps_video_parameter_set_id | u(4) |
|   sps_max_sub_layers_minus1 | u(3) |
|   sps_temporal_id_nesting_flag | u(1) |
|   profile_tier_level( 1, sps_max_sub_layers_minus1 ) | |
|   sps_seq_parameter_set_id | ue(v) |
|   chroma_format_idc | ue(v) |
|   if( chroma_format_idc == 3 ) | |
|     separate_color_plane_flag | u(1) |
|   pic_width_in_luma_samples | ue(v) |
|   picheight_in_luma_samples | ue(v) |
|   conformance_window_flag | u(1) |
|   if( conformance_window_flag ) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   *number_of_additional_components* | ue(v) |
|   *for( i = 0; i number_of_additional_components;i++ ) {* | |
|     *log2_pic_width_in_cmp_scale[i]* | *ue(v)* |
|     *log2_pic_height_in_cmp_scale[i]* | *ue(v)* |
|     *bit_depth_cmp_minus8[i]* | *ue(v)* |
|     *cmp_type[i]* | *ue(v)* |
|   *}* | |
|   log2_max_pic_order_cnt_lsb_minus4 | ue(v) |
| ... | |
| } | |

Including components in addition to color components in a layer of a coding scheme may impact other layers of a coding scheme, as well as how encoding is applied to image data encoded according to the coding scheme. For example, the additional components specified in the layer of the coding scheme may be handled as "individual" independent components or grouped together with other components for the purposes of prediction or other types of processing (e.g. including encoder or decoder features such as Sample Adaptive Offset (SAO), deblocking, or transform size/type indication, among others discussed below with regard to FIGS. 2 and 3) for encoding or decoding, in some embodiments. Grouping of components may be identified at various layers, such as a SPS, PPS, tile, slice layer, in some embodiments. In some embodiments, grouping may be identified according to some other form or group of blocks or Coding Tree Unit (CTU), in some embodiments. Grouping of components may be adapted based on content characteristics, and order of components signaled, in some embodiments.

In some embodiments, for each component or group of components an indication can be provided of different prediction modes (e.g., mode decision block 222 in FIG. 2), intra prediction or inter prediction, or also permit copying/indicating the same prediction mode as an earlier/higher level component/component group, in some embodiments. All components belonging in one group may have to use the same coding mode, in some embodiments. Relationships between components (e.g., from which component it is permitted to copy the prediction mode) could be again indicated at another layer (e.g., a higher layer, such as a slice or tile when compared to a SPS layer), in some embodiments.

Prediction of modes could be permitted from multiple previous groups in some embodiments. For example, for a coding scheme that handles 6 components and has 3 groups, prediction for group 0 may have to be done independently as the first group. However, for group 1, the mode selected for group 0 could likely be a very highly likely prediction candidate and could be considered as a most probable prediction mode for group 1. For group 2, the modes selected for group 0 and group 1 may also impact the most probable modes for this group. For example, if both are the same, then there is only one most probable mode, the mode used by both groups 0 and group 1. If they are different, then depending on the specified relationships, one of the modes can be set as the most probable one (i.e. the one from group 0), and the second one could be the second most probable mode. Such considerations could be exploited for improved coding of the current group, in some embodiments.

In some embodiments, a component block partitioning tree could be combined or separate. Combination of a component block partitioning tree could be performed, in some examples, based on whether some components are grouped together or not.

In some embodiments, common motion information can be reused across all components for an inter prediction mode. However, an indication may be provided that for some components or component groups a different motion vector is be used. In such a case, that motion vector could be signaled independently from the other components, or could also be differentially encoded versus these components, in some embodiments. A flag could also be signaled at different levels, including block level, whether the motion of that block would differ, in some embodiments.

In some embodiments, transforms, quantization parameters, and quantization matrices could be signaled independently for each component, or could be shared for a component group. Moreover, a different grouping could also be defined for such operations (e.g., transforms, quantization parameters, and quantization matrices) than a grouping used for other operations such as prediction, in some embodiments. For example, two components may belong in the same group for inter prediction, however, they may belong to distinct groups for transform and quantization use and signaling. In such an example, quantization parameters may be signaled at the SPS, PPS, Slice header, or even down to the CTU or Quantization Group level, for each component or component group independently, in some embodiments, or such parameters could also be specified to have certain relationship with other groups, e.g. group 2 is set to a quantization value equal to the quantization value of group 1+a predefined offset, in some embodiments.

In some embodiments, residual coefficients for all components may be signaled together at certain stages of a coding stage (e.g. a transform unit). However, residual data could also be grouped together per component or component group at larger units (e.g. a CTU, group of CTUs, slices, or even frames) and signaled in such groups instead, in other embodiments. Such partitioning may be beneficial for some types of data and for components that may have different priority, or for error resiliency and compression purposes (as placing similar data together can in many cases improve entropy coding).

Since different components may be of different resolutions, different filters (e.g., length and characteristics) may have to be used for these different components or component groups, in some embodiments. The filters could be predefined, or could also be specified at different layers, (e.g. SPS, PPS, slice header, etc.) of the coding scheme, in some embodiments. The filters could be signaled explicitly, i.e. number of taps, and tap values, or selected from a predefined table list, in some embodiments.

In various embodiments, grouping of operations based on the signaled component groups could also be done for other encoding or decoding processes discussed in FIGS. 2 and 3 below, such as deblocking (e.g., providing an indication of filtering strength), SAO (e.g., providing a filtering mode), and Adaptive Loop Filtering (ALF) (e.g., providing the filtering technique to be applied among other in-loop filtering modes that may be used by a coding scheme). For example, only one set of parameters for a given in-loop filtering mode may be sent instead of replicating the parameters for every component, in some embodiments. As noted above, groups for one (or multiple) operations may not need to be the same as the groups used for other operations, such as prediction and transform coding, in some embodiments.

For a deblocking filter mechanism it may be desirable to also be able to use different length filters for processing the data, depending also on the resolution of the data, in some embodiments. The length of these processing filters may be predefined depending on the resolution of the component and its relationship to a main color component or group, or could be indicated independently for each component or component group, in some embodiments, as specified in a coding scheme.

Operations, such as weighted prediction, may reuse the weights from other components, or have independently coded weights, or the weights could be derived for the different components based on some predefined relationships/functions between the different color components, in some embodiments. For example, if a component with index 1 uses weighted prediction, then for another component with index 2 it may be specified that also the weighted prediction should be used, or in another example, the weights for component with index 2 may be specified as equal to two times the weights used for component with index 1.

Coding modes for some (or all) components could be the same, in which case the coding mode for these components may be in sync (or could be different), in some embodiments. For example, the first N components could be encoded using an inter prediction mode with single prediction, whereas the subsequent M components may be encoded using intra prediction, and the remaining L components may be encoded using bi-prediction. Such modes could be indicated with a set of flags in the picture, slice, tile, group of blocks, CTU, prediction unit, or block level. In the case of a picture image, for example, the relationship may be forced for the entire picture, in some embodiments. Likelihood of modes, which can impact the entropy coding process, can also be adapted based on the relationship of the components and could be known at both encoder and decoder or signaled in the bit stream, in some embodiments.

Components may be predicted from other components that precede them using linear or nonlinear prediction modes, in some embodiments. Such a prediction mode may be an extension of the LM prediction and cross-component prediction modes implemented in HEVC, in some embodiments. The prediction models and relationship between components could be predefined, and therefore known at both encoder and decoder, or could be signaled in the bit stream, in some embodiments. An encoder can use a variety of rate distortion criteria, as well as other criteria like complexity, to determine said mode during the encoding process, in some embodiments.

Different components may be signaled at different frame rates, in some embodiments. For example, some pictures/frames may have a different number and type of components than other frames. Whether different components exist in some frames than others, could be signaled at the sequence or Group of Pictures level, in which case a fixed pattern/period of component occurrence per picture could be used, or could even be signaled for each frame, signaling components at different frame rates would be more flexible. Availability or not of some components could be done at the region level, in some embodiments. For example, it is possible that an entire partition not to have one particular component, especially if the video was created by concatenating multiple videos with different characteristics.

In some embodiments, some components may also be missing because of differences in sensors, (e.g., a sensor may cover a smaller angle of view versus other sensors and therefore maybe has not captured the same areas as other sensors). During prediction, it may be possible to restrict prediction of blocks to blocks that have the same components (or at least contain the same components, and may allow for additional components in that prediction to be capable of being discarded), in some embodiments. In an alternative embodiment, prediction may be permitted even from areas that contain different components, however only the common components are predicted in such a case. The additional components in the prediction may be discarded, while the remaining components not yet predicted could be predicted using other means, (e.g., from another region or using intra prediction or no prediction), for instance. Such information could be predefined or signaled within the bit stream at different coding stages, in some embodiments.

Transform coding could be done with a variety of transforms, including Discrete Cosine Transform (DCT), Discrete Sine Transform (DST), Hadamard, as well as wavelet transforms, of different precision and sizes, in some embodiments. 2D as well as 1D separable transforms could be used, and the transforms may change when applied horizontally or vertically, in some embodiments. Different components may select to use different transforms than other components, in some embodiments. Such could be predefined given the component, adapted based on the relationship of a component with another component and/or its prediction mode, or could be explicitly signaled at different coding stages (e.g. sequence, picture, tile, slice, group of blocks, CTU, transform unit, block etc.), in some embodiments.

In some embodiments, coding decisions could be based on all components within a group. For example, coding decisions could be determined by computing distortion for all components based on some metric, (e.g., Mean Squared Error (MSE), Shortest Absolute Difference (SAD), Structural Similarity (SSIM), etc.), in some embodiments, or coding decisions could be based on one or more primary components within a group of components or for all components, for some or all decisions. For example, for motion estimation coding stage, when YCbCr data is used, initial or even the full motion estimation process may be performed using only the Y component for all samples. Refinements of the motion estimation per component could then utilize the motion vectors derived from the motion estimation performed on the Y component and then refine said motion vectors using the current component or a "main" component in the current group.

Figure 3:
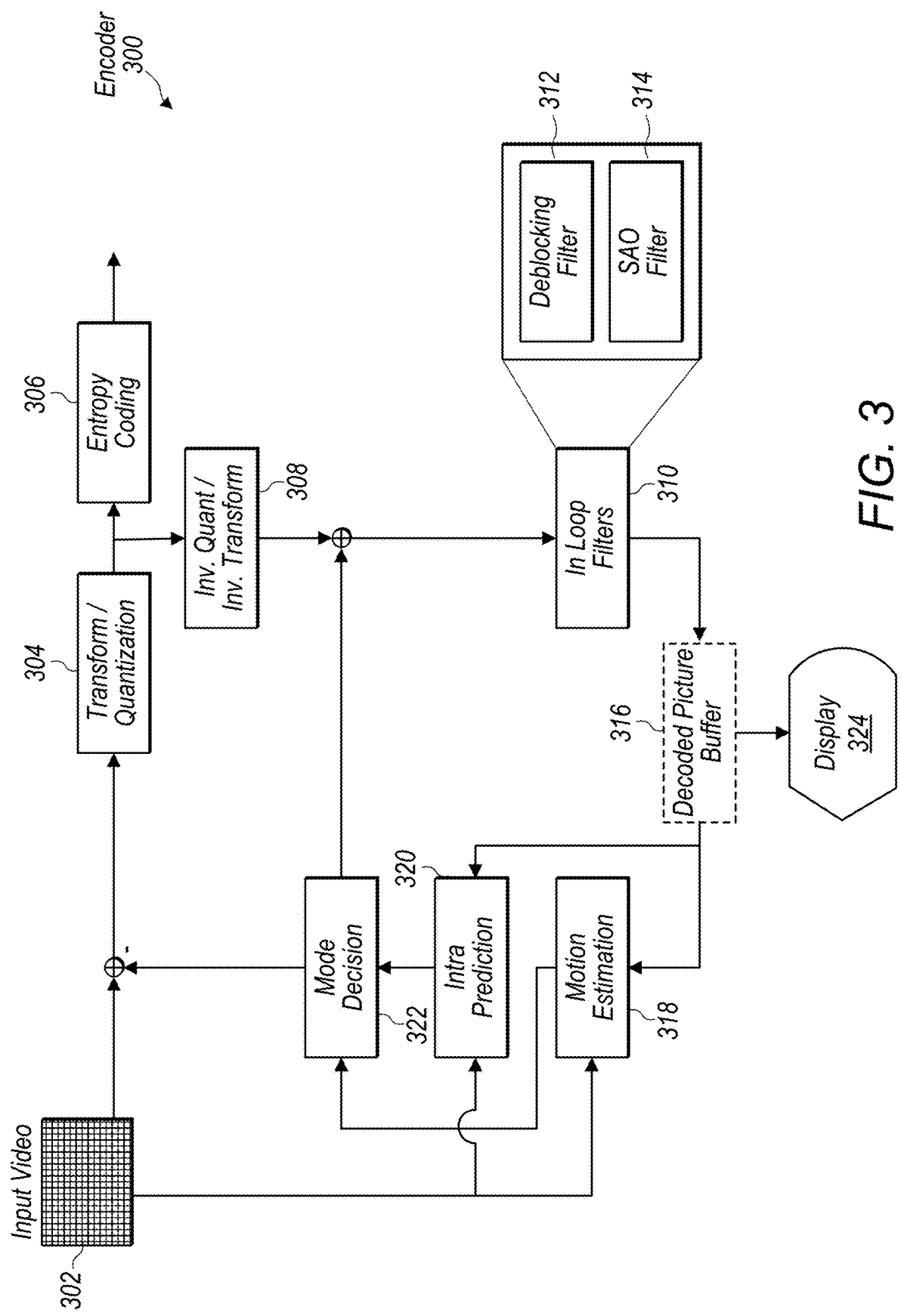
FIG. 3 illustrates an example encoder that extends supported components for encoding image data, according to some embodiments.

FIG. 3 illustrates an example encoder that extends supported components for encoding image data, according to some embodiments. Encoder 300 may implement various coding stages as part of generating encoded image data according to the various components of image data, as discussed above. Input video data 302 may be received at encoder 300 for encoding. Input video data 302 may be provided to predict data via intra prediction coding stage 320 and/or motion estimation 318 coding stages. For example, intra prediction 320 coding stage may determine predicted, intra coded data, which may be based on a previously encoded portion (e.g., a block or macroblock of image data), as indicated from the input to intra prediction 320 coding stage from decoded picture buffer 316 stage (which may store previous input video data). Motion estimation 318 may determine motion estimation as motion vectors that may describe the movement between images in a sequence of image data (e.g., by comparing input video data 302 to image data from decoded picture buffer 316). Encoder 300 may implement mode decision coding stage 322, which may be used to select a prediction (e.g., from intra prediction coding stage 320 and motion estimation coding stage 318).

In some embodiments, the selected predicted data from mode decision 322 may be compared to the input video data 302 to determine residual video data (e.g. differences between the predicted video data and the input video data 302). The residual video data is further processed via a transformation/quantization coding stage 304. The transformed/quantized residual data may then be entropy encoded via entropy encoding coding stage 306 and output as encoded video data (e.g., a compressed bitstream of image data). For example, entropy encoding coding stage 306 may apply one of multiple different entropy encoding techniques, such as a loss-less data compression technique like Huffma coding or Golomb coding, among other techniques.

Encoder 300 may also include an inverse quantization/inverse transformation coding stage 308. The inverse quantization/inverse transformation coding stage 308 may reconstruct the residual video data. The output of the inverse quantization/inverse transformation coding stage 308 may be provided to a predictor that generates a reconstructed version of the original input video data 302. The reconstructed version of the video data may be used to determine any distortion introduced due to the transformation/quantization performed at transform/quantization coding stage 304 and/or any distortion resulting from the prediction from mode decision 322. The reconstructed version of the video data may be further processed by in loop filters 310, such as deblocking filter 312, which may smooth edges between blocks in image data being encoded, and/or SAO filter 314, which may reduce artifacts between samples (e.g., blocks) in image data by classifying samples into categories and adjusting the offsets of sample categories) and stored in decoded picture buffer 316 (which may in some embodiments provide the filtered image data to display 324). The images in the decoded picture buffer 316 may be used by motion estimation coding stage 318 and intra prediction coding stage 318.

Please note that different features, components, or arrangements of features or components may be implemented in other embodiments to implement an encoder 300 that extends supported components for encoding image data, and thus the previous examples are not intended to be limiting. The features described above may be implemented as software on a processor (e.g., a processor executing firmware or other instructions as part of computer system 1000), dedicated circuitry (e.g., as an Application Specific Integrated Circuit (ASIC) or Field Programmable gate array (FPGA), or Combination thereof.

Figure 4:
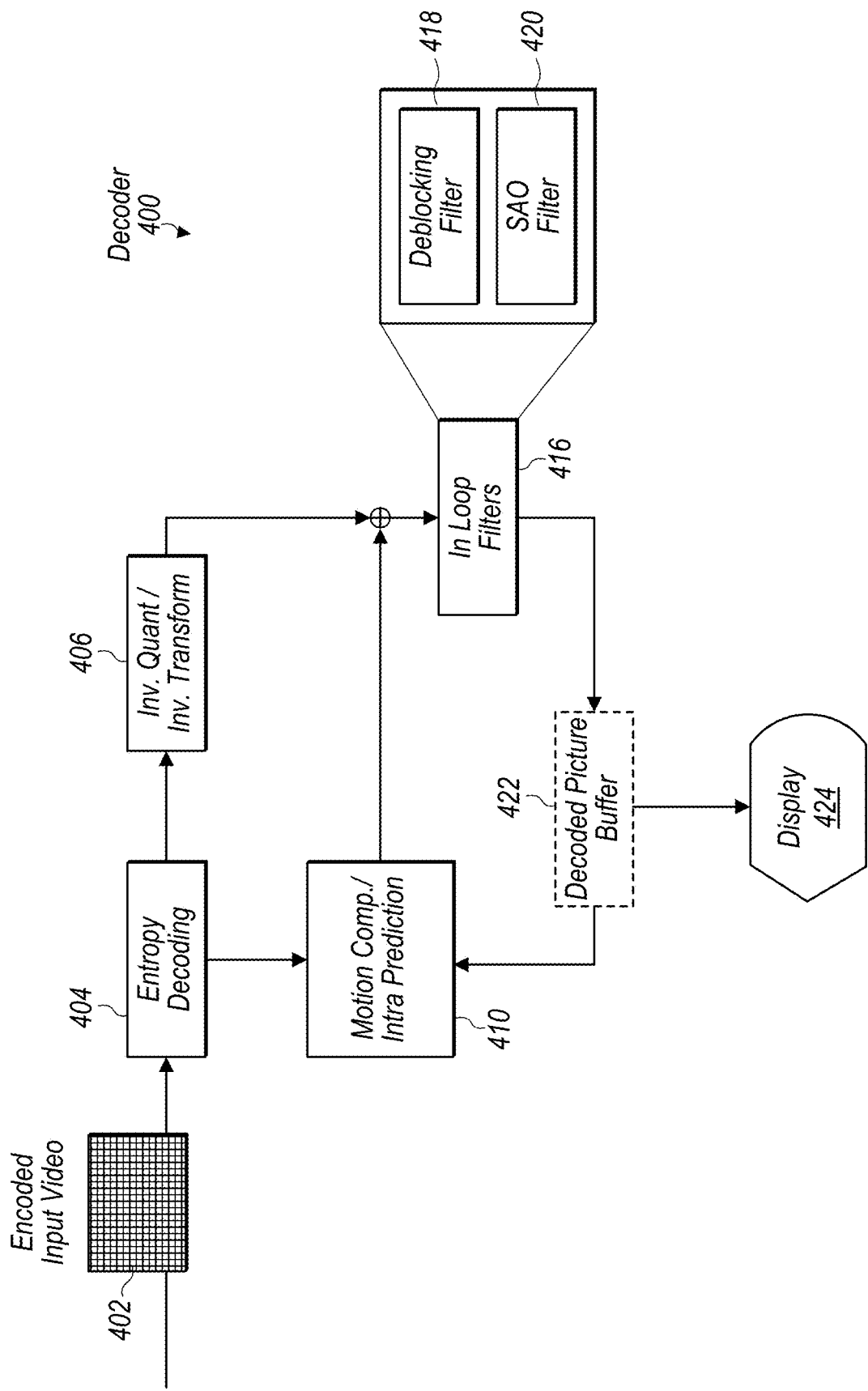
FIG. 4 illustrates components of a decoder that extends supported components in encoded image data, according to some embodiments.

FIG. 4 illustrates components of a decoder that extends supported components in encoded image data, according to some embodiments. Decoder 400 may implement various coding stages to decode encoded input video 402, according to the components and characteristics specified in a coding scheme as discussed above, in various embodiments. For example, decoder 400 may implement entropy decoding stage 404 which may decode encoded input video data 402, such as by decompressing the encoded input video 402 according to a loss-less data compression technique like Huffma coding or Golomb coding, among other techniques.

The decoded image data may be used as input to inverse quantization/inverse transformation coding stage 406 to reconstruct the residual video data and motion compensation and intra prediction stage 410 to provide predicted data. The prediction data determined for decoded data (e.g., using the techniques discussed above) may be combined with the residual data and processed using in loop filters 416, in some embodiments. Similar to the discussion above with regard to FIG. 3, inloop filters 416 may include deblocking filter 418 coding stage and SAO filter 420 coding stage.

The output of in loop filters 416 may be stored in decoded picture buffer 422, in some embodiments. The decoded image data may also be output via display 424, in some embodiments.

Please note that different features, components, or arrangements of features or components may be implemented in other embodiments to implement a decoder that extends supported components for encoded image data, and thus the previous examples are not intended to be limiting. The features described above may be implemented as software on a processor (e.g., a processor executing firmware or other instructions as part of computer system 1000), dedicated circuitry (e.g., as an Application Specific Integrated Circuit (ASIC) or Field Programmable gate array (FPGA), or Combination thereof.

Figure 5:
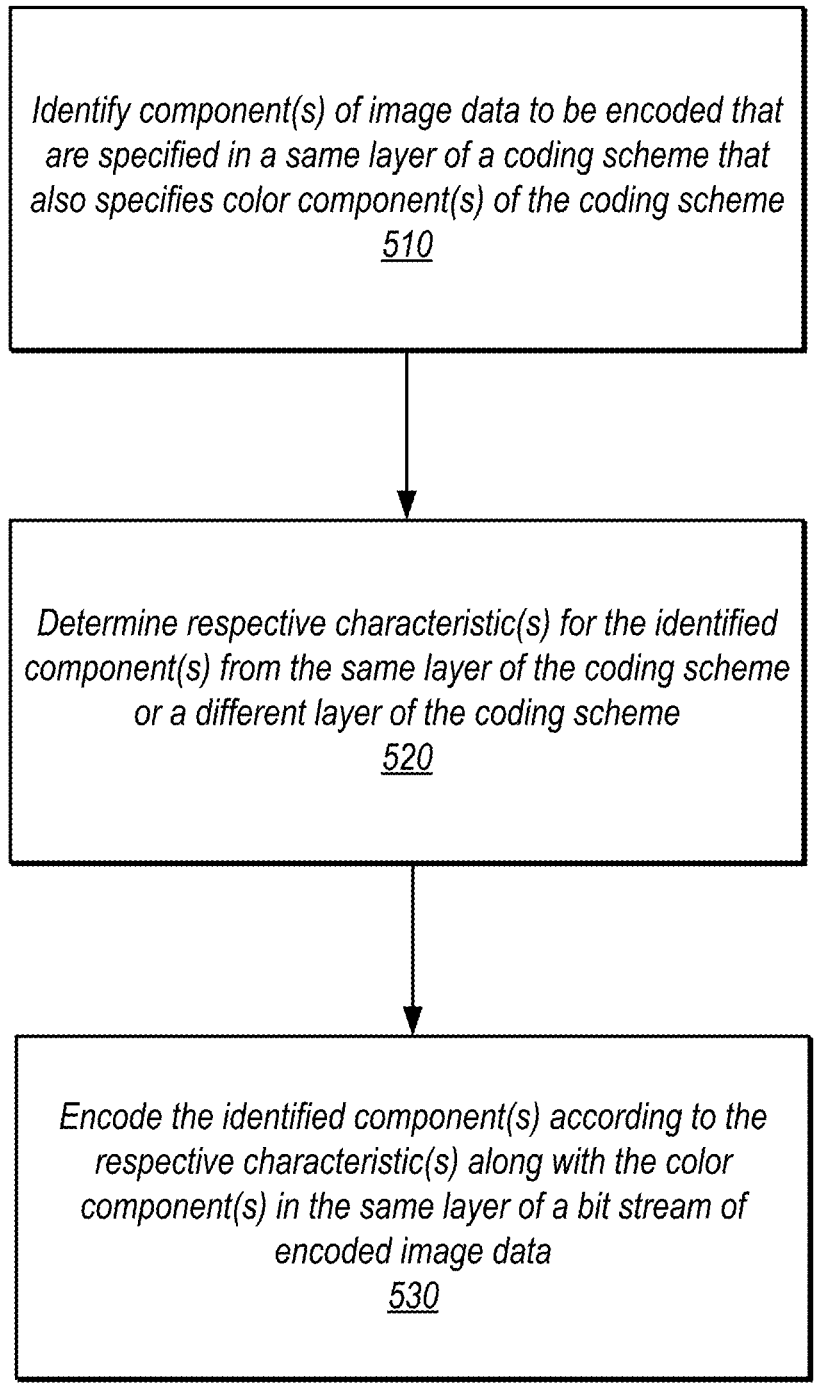
FIG. 5 is a high-level flowchart illustrating various methods and techniques for encoding image data utilizing a coding scheme that specifies color and other components in a same layer, according to some embodiments.

Although FIGS. 1-4 have been described and illustrated in the context of example coding schemes, encoders, and encoders, the various techniques and components illustrated and described in FIGS. 1-4 may be applied in other coding schemes, encoders, and decoders in different embodiments that may implement additional components specified in a same layer as other color components. FIG. 5 is a high-level flowchart illustrating various methods and techniques for encoding image data utilizing a coding scheme that specifies color and other components in a same layer, according to some embodiments. Encoders as discussed above with regard to FIGS. 1-4 may implement these techniques, as well as other systems or devices that perform encoding of image data.

As indicated at 510, component(s) of image data to be encoded that are specified in a same layer of a coding scheme that also specifies color component(s) of the coding scheme may be identified, in some embodiments. For example, as discussed above, a coding scheme layer may implement a syntax that allows for a specified number of components to be included in the coding scheme (e.g., component 0, 1, 2, 3 and so on), where some components are color components and other components, such as texture, transparency, or other image data values may be specified in other components. In some embodiments, a tiered coding scheme, which allows for default components or extensible components to be specified according to an indication in the coding scheme. Components may be identified by parsing or otherwise evaluating the layer of the coding scheme (e.g., by reading different parameter field values in a parameter set layer that specify the different components as illustrated in Tables 2 and 3 above).

As indicated at 520, respective characteristic(s) for the identified component(s) from the same layer of the coding scheme or a different layer of the coding scheme, in some embodiments. Component characteristics may include, but are not limited to, component resolution, component bitdepth, component phase—if resolution different from that of a "main signal/component"—and/or other information about what an additional component represents, in some embodiments. These characteristics may be determined in the same layer (e.g., in a sub-layer of the parameter set) or from another layer of the coding scheme. As discussed above, different groups of components may be specified, which may also specify respective characteristics common to the components in a group. In some embodiments, one characteristic may be common to a group of components while other characteristics of the same components (or least one of the components) may be independently determined, and therefore may have a different value. In some embodiments, characteristics may be specified by an absolute value or by a value relative to another characteristic value.

As indicated at 530, the identified component(s) may be encoded according to the respective characteristic(s) along with the color component(s) in the same layer of a bitstream of encoded imaged data, in some embodiments. For example, the additional component values and characteristic values may be encoded in the same bitstream as the color component(s) (and color component characteristic values), in some embodiments. Encoding techniques, such as entropy encoding may be applied to generate a compressed version of the image data, as a compressed bitstream.

Figure 6:
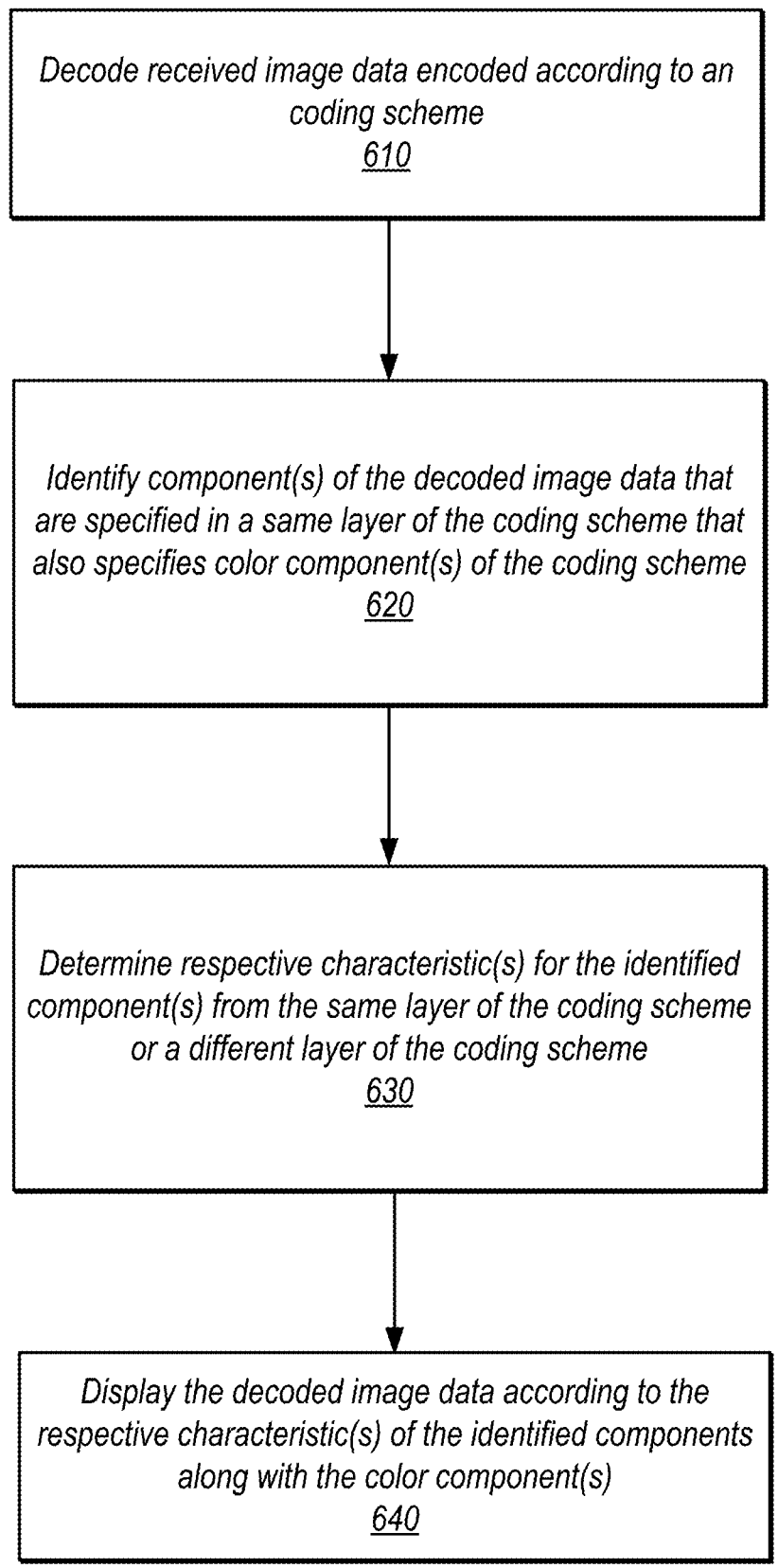
FIG. 6 is a high-level flowchart illustrating various methods and techniques for decoding encoded image data utilizing a coding scheme that specifies color and other components in a same layer, according to some embodiments.

FIG. 6 is a high-level flowchart illustrating various methods and techniques for decoding encoded image data utilizing a coding scheme that specifies color and other components in a same layer, according to some embodiments. As indicated at 610, received image data that is encoded according to a coding scheme may be decoded, in some embodiments. Decoding techniques, such as entropy decoding may be applied to generate a decompressed version of the image data, as a decompressed bitstream, in some embodiments.

As indicated at 620, component(s) of the decoded image data that are specified in a same layer of a coding scheme that also specifies color component(s) of the coding scheme may be identified, in some embodiments. For example, as discussed above, a coding scheme layer may implement a syntax that allows for a specified number of components to be included in the coding scheme (e.g., component 0, 1, 2, 3 and so on), where some components are color components and other components, such as texture, transparency, or other image data values may be specified in other components. In some embodiments, a tiered coding scheme, which allows for default components or extensible components to be specified according to an indication in the coding scheme. Components may be identified by parsing or otherwise evaluating the layer of the coding scheme (e.g., by reading different parameter field values in a parameter set layer that specify the different components as illustrated in Tables 2 and 3 above).

As indicated at 630, respective characteristic(s) for the identified component(s) from the same layer of the coding scheme or a different layer of the coding scheme, in some embodiments. As discussed above, component characteristics may include, but are not limited to, component resolution, component bitdepth, component phase—if resolution different from that of a "main signal/component"—and/or other information about what an additional component represents, in some embodiments. These characteristics may be determined in the same layer (e.g., in a sub-layer of the parameter set) or from another layer of the coding scheme. As discussed above, different groups of components may be specified, which may also specify respective characteristics common to the components in a group. In some embodiments, one characteristic may be common to a group of components while other characteristics of the same components (or least one of the components) may be independently determined, and therefore may have a different value. In some embodiments, characteristics may be specified by an absolute value or by a value relative to another characteristic value.

As indicated at 640, the decoded image data may be displayed according to the respective characteristic(s) of the identified component(s) along with the color component(s), in some embodiments. For example, as noted earlier, the additional components that enhance the display of color data may be utilized from the decoded data.

Example Computer System

Figure 7:
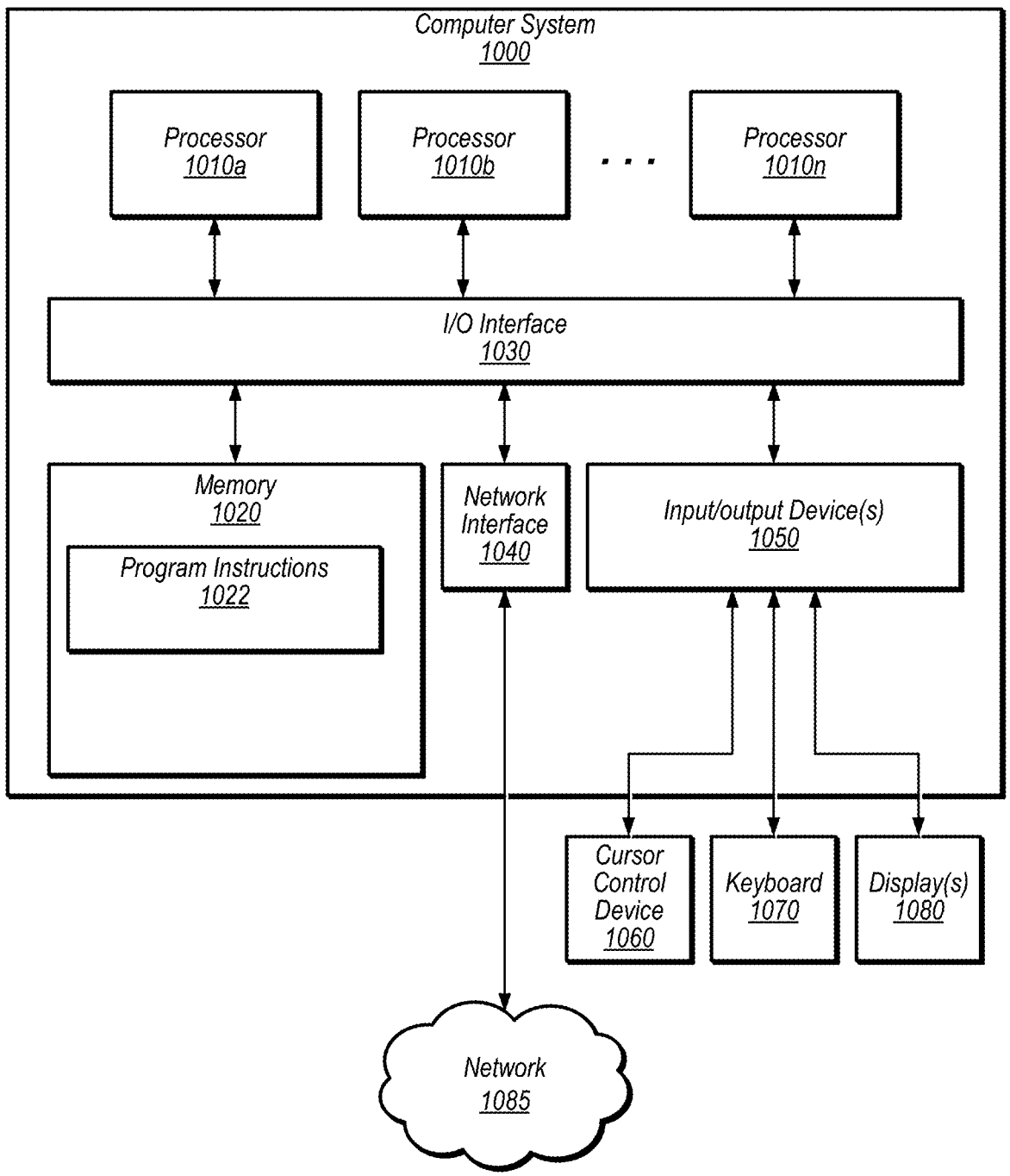
FIG. 7 illustrates an example computer system that may implement an encoder or decoder, according to some embodiments.

FIG. 7 illustrates an example computer system 1000 that may implement an encoder or decoder or any other ones of the components described herein, (e.g., any of the components described above with reference to FIGS. 1-6), in accordance with some embodiments. The computer system 1000 may be configured to execute any or all of the embodiments described above. In different embodiments, computer system 1000 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of an encoder or decoder, as described herein may be executed in one or more computer systems 1000, which may interact with various other devices. Note that any component, action, or functionality described above and with respect to FIGS. 1-6 may be implemented on one or more computers configured as computer system 1000 of FIG. 7, according to various embodiments. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some cases, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store point cloud compression or point cloud decompression program instructions 1022 and/or sensor data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions 1022 may be configured to implement an image sensor control application incorporating any of the functionality described above. In some embodiments, program instructions and/or data may be received, sent or stored upon different types of computer-accessible media or on similar media separate from system memory 1020 or computer system 1000. While computer system 1000 is described as implementing the functionality of functional blocks of previous Figures, any of the functionality described herein may be implemented via such a computer system.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network 1085 (e.g., carrier or agent devices) or between nodes of computer system 1000. Network 1085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or accessing data by one or more computer systems 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1022, which may be processor-executable to implement any element or action described above. In one embodiment, the program instructions may implement the methods described above. In other embodiments, different elements and data may be included. Note that data may include any data or information described above.

Those skilled in the art will appreciate that computer system 1000 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. One or more non-transitory, computer-readable storage media, storing program instructions that when executed on or across one or more computing devices cause the one or more computing devices to implement:
    identifying one or more components of image data of a single block to be encoded that are specified in a same layer of a coding scheme in addition to a specified number of color components for the single block also specified in the same layer of the coding scheme;
    determining a respective one or more characteristics for the identified one or more components of the single block from the same layer of the coding scheme or a different layer of the coding scheme; and
    encoding the identified one or more components of the single block according to the respective one or more characteristics along with the specified number of color components in the same layer of a bit stream of encoded image data, wherein an encoded value of a characteristic of the one or more characteristics for at least one component of the identified one or more components of the single block is signaled based on an encoded value associated with a characteristic of the one or more characteristics for at least one other component of the identified one or more components of the single block.

2. The one or more non-transitory, computer-readable storage media of claim 1, wherein, in determining the respective one or more characteristics for the identified one or more components of the single block, the program instructions cause the one or more computing devices to implement parsing absolute values for the one or more characteristics from the same layer or the different layer.

3. The one or more non-transitory, computer-readable storage media of claim 1, wherein, in identifying one or more components of image data of the single block to be encoded, the program instructions cause the one or more computing devices to implement determining a number for the one or more components of the single block and the one or more color components corresponding to the specified number of color components in the layer.

4. The one or more non-transitory, computer-readable storage media of claim 1, wherein the one or more specified components of the single block are identified as a group of components with at least one of the respective one or more characteristics is the same for the group of components, and wherein the group is specified in the same layer of the coding scheme.

5. The one or more non-transitory, computer-readable storage media of claim 4, wherein individual other ones of the respective characteristics for the group of components are specified differently for transform and quantization coding stages in an encoder that performs the encoding of the image data.

6. The one or more non-transitory, computer-readable storage media of claim 1, wherein, in encoding the identified one or more components of the single block according to the respective one or more characteristics along with the specified number of color components in the same layer of the bit stream of encoded image data, the program instructions cause the one or more computing devices to implement applying one or more in loop filters that are individually configured for different ones of the specified one or more components of the single block.

7. A system, comprising:
    at least one processor; and
    a memory, storing program instructions that when executed by the at least one processor cause the at least one processor to:
        receive a parameter set of a coding scheme that specifies one or more components of image data of a single block to be encoded in addition to a specified number of color components for the single block also in a same layer of the coding scheme;
        determine a respective one or more characteristics for the specified one or more components of the single block from the parameter set of the coding scheme or a different layer of the coding scheme;
        receive the image data to be encoded;
        generate an encoded bit stream of the image data according to the respective one or more characteristics of the specified one or more components of the single block along with the specified number of color components in a bit stream of encoded image data, wherein an encoded value of a characteristic of the one or more characteristics for at least one component of the specified one or more components of the single block is signaled based on an encoded value associated with a characteristic of the one or more characteristics for at least one other component of the specified one or more components of the single block; and
        send the encoded bit stream of the image data to a recipient decoder.

8. The system of claim 7, wherein to determine the respective one or more characteristics for the specified one or more components of the single block, the program instructions cause the processor to determine a second one of the respective characteristics relative to a first one of the respective characteristics.

9. The system of claim 7, wherein the parameter set indicates that the coding scheme does not implement a predefined set of components that does not include the specified one or more components of the single block.

10. The system of claim 7, wherein the one or more specified components of the single block are identified as a group of components with at least one of the respective one or more characteristics is the same for the group of components, and wherein the group is specified in the different layer of the coding scheme.

11. The system of claim 10, wherein the at least one characteristic that is the same for the group of components is a selection of predicted data generated by an encoder that performs the generation of the encoded bitstream.

12. The system of claim 10, wherein at least one of the specified one or more components of the single block is included in a different group of components that does not include another one of the specified one or more components of the single block.

13. The system of claim 7, wherein a number of the specified one or more components of the single block for the encoded image data is specified for a first frame, wherein a different of number components is specified for a second frame according to the coding scheme.

14. One or more non-transitory, computer-readable storage media, storing program instructions that when executed on or across one or more computing devices cause the one or more computing devices to implement:
    decoding received image data that is encoded according to a coding scheme;
    identifying one or more components of the decoded image data of a single block of that are specified in a same layer of the coding scheme in addition to a number of color components also specified in the same layer of the coding scheme, wherein an encoded value of a characteristic of the one or more characteristics for at least one component of the identified one or more components of the single block is signaled based on an encoded value associated with a characteristic of the one or more characteristics for at least one other component of the identified one or more components of the single block;
    determining a respective one or more characteristics for the identified one or more components of the single block from the same layer of the coding scheme or a different layer of the coding scheme; and
    displaying the decoded image data according to the respective one or more characteristics for the identified one or more components of the single block along with the specified number of color components.

15. The one or more non-transitory, computer-readable storage media of claim 14, wherein, in determining the respective one or more characteristics for the identified one or more components of the single block, the program instructions cause the one or more computing devices to implement parsing absolute values for the one or more characteristics from the same layer or the different layer.

16. The one or more non-transitory, computer-readable storage media 14, wherein, in identifying one or more components of the single block of the decoded image data, the program instructions cause the one or more computing devices to implement determining a number for the one or more components of the single block unitary location as part of determining the specified number of color components in the layer.

17. The one or more non-transitory, computer-readable storage media of claim 14, wherein the one or more specified components of the single block are identified as a group of components with at least one of the respective one or more characteristics is the same for the group of components, and wherein the group is specified in the same layer of the coding scheme.

18. The one or more non-transitory, computer-readable storage media of claim 17, wherein individual other ones of the respective characteristics for the group of components are specified independently.

19. The one or more non-transitory, computer-readable storage media of claim 14, wherein, in decoding the image data, the program instructions cause the one or more computing devices to implement applying one or more in loop filters that are individually configured for different ones of the specified one or more components of the single block.

20. The one or more non-transitory, computer-readable storage media of claim 14, wherein a number of the specified one or more components of the single block for the encoded image data is specified for a first frame, wherein a different of number components is specified for a second frame according to the coding scheme.

21. A system, comprising:
    a display;
    at least one processor; and
    a memory, storing program instructions that when executed by the at least one processor cause the at least one processor to:
        receive image data encoded according to a coding scheme;
        decode the image data according to the coding scheme;
        evaluate a parameter set of the coding scheme that specifies one or more components of the decoded image data of a single block in addition to a specified number of color components also in a same layer of the coding scheme;
        determine a respective one or more characteristics for the specified one or more components of the single block from the parameter set of the coding scheme or a different layer of the coding scheme, wherein an encoded value of a characteristic of the one or more characteristics for at least one component of the specified one or more components of the single block is signaled based on an encoded value associated with a characteristic of the one or more characteristics for at least one other component of the specified one or more components of the single block; and
        output the decoded image data according to the respective one or more characteristics for the specified one or more components of the single block along with the specified number of color components via the display.

22. The system of claim 21, wherein to determine the respective one or more characteristics for the specified one or more components of the single block, the program instructions cause the processor to determine a second one of the respective characteristics relative to a first one of the respective characteristics.

23. The system of claim 21, wherein the parameter set indicates that the coding scheme does not implement a predefined set of components that does not include the specified one or more components of the single block.

24. The system of claim 21, wherein the one or more specified components of the single block are identified as a group of components with at least one of the respective one or more characteristics is the same for the group of components, and wherein the group is specified in the different layer of the coding scheme.

25. The system of claim 24, wherein the at least one characteristic that is the same for the group of components is a selection of predicted data generated by a decoder that performs the generation of the encoded bitstream.

* * * * *